United States Patent
Ford et al.

(10) Patent No.: US 12,446,836 B2
(45) Date of Patent: Oct. 21, 2025

(54) MULTI-PERSON BABY MONITOR ALARM

(71) Applicants: Benjamin Ford, The Woodlands, TX (US); Kimberly Ford, The Woodlands, TX (US)

(72) Inventors: Benjamin Ford, The Woodlands, TX (US); Kimberly Ford, The Woodlands, TX (US)

( * ) Notice: Subject to any disclaimer, the term of this patent is extended or adjusted under 35 U.S.C. 154(b) by 168 days.

(21) Appl. No.: 18/357,824

(22) Filed: Jul. 24, 2023

(65) Prior Publication Data

US 2025/0032055 A1 Jan. 30, 2025

(51) Int. Cl.
*A61B 5/00* (2006.01)
*G08B 21/02* (2006.01)

(52) U.S. Cl.
CPC .............. *A61B 5/74* (2013.01); *A61B 5/0002* (2013.01); *A61B 5/4809* (2013.01); *A61B 5/4812* (2013.01); *A61B 5/4815* (2013.01); *G08B 21/0208* (2013.01)

(58) Field of Classification Search
CPC ....... A61B 5/74; A61B 5/0002; A61B 5/4809; A61B 5/4812; A61B 5/4815; A61B 5/7282; A61B 2503/04; A61B 5/746; G08B 21/0208; G08B 21/0225
See application file for complete search history.

(56) References Cited

U.S. PATENT DOCUMENTS

| | | | | |
|---|---|---|---|---|
| 2004/0257233 | A1* | 12/2004 | Proebsting | G08B 23/00 340/539.1 |
| 2008/0191885 | A1* | 8/2008 | Loree, IV | A61B 5/6828 600/595 |
| 2016/0066716 | A1* | 3/2016 | Rao | A61B 5/6814 600/26 |
| 2016/0374567 | A1* | 12/2016 | Breslow | A61B 5/02405 600/301 |
| 2017/0206766 | A1* | 7/2017 | Child | G08B 21/0211 |
| 2018/0085549 | A1* | 3/2018 | Kaislasaari | A61B 5/742 |
| 2019/0224443 | A1* | 7/2019 | Jantunen | A61B 5/4812 |
| 2021/0190351 | A1* | 6/2021 | Hilbig | A61B 5/746 |
| 2022/0133221 | A1* | 5/2022 | Lawlor | G16H 40/63 600/300 |

* cited by examiner

*Primary Examiner* — Ryan W Sherwin (57) ABSTRACT

Described herring are systems and techniques for improving the way multiple sleeping people decide who should wake up in response to crying baby. A system includes a processor coupled to a first sleep tracker, a second sleep tracker, and a sensor. The first sleep tracker tracks the sleep of a first person and sends sleep data to the processor, while the second sleep tracker tracks the sleep of a second person and sends sleep data to the processor. The sensor monitors a subject and sends a signal when a change with the subject is detected. The processor receives a signal from the sensor and compares the sleep data from the first and second sleep trackers. The processor also determines which of the first person or second person to alert based on the comparison and transmits an alert to one of the first person or the second person.

16 Claims, 6 Drawing Sheets

MULTI-PERSON BABY MONITOR ALARM

BACKGROUND

Conventional baby monitors are very simple in operation. They capture sounds and/or images of a baby or other subject and relay the captured image or sounds to a remote device which presents an audio or video feed to everyone near the remote device. All of the users near the remote device, are able to hear or view the target subject. However, conventional baby monitors do not allow for only certain users near the remote device to be notified of the target's activities.

Parents using conventional baby monitors to be notified of their baby's activity while they sleep are forced to have both parents be alerted, while a situation may only require one parent to attend to the baby. Having both parents be alerted by a baby's activity causes both parents to lose sleep whenever the baby needs attention. This sleep loss is the cause of a common complaint among parents of young children, sleep deprivation.

SUMMARY

Example embodiments and implementations described herein are directed to methods, systems, and apparatuses of monitoring a subject while multiple persons sleep, receiving data about the people sleeping, making a determination about which one of the persons sleeping is in the best condition to be alerted when a change occurs in the subject, and alerting that person.

In one example embodiment, a method comprising: collecting sleep data from a first sleep tracker about a first person and a second sleep tracker about a second person. A signal is received from a sensor. The method also includes determining which of the first person or the second person to alert based on the sleep data and a criteria; and alerting the first person or the second person based on the determination.

In another example embodiment a system comprises a processor coupled to a first sleep tracker, a second sleep tracker, and a sensor. The first sleep tracker gathers a first sleep data about a first person and transmits the first sleep data to the processor and the second sleep tracker gathers a second sleep data about a second person and transmits the second sleep data to the processor. The sensor monitors a subject and sends a signal to the processor when a change is detected. The processor determines whether to alert the first person or the second person based on the first sleep data, the second sleep data, and a criteria; and the processor alerts the first person or the second person based on the determination.

In another example embodiment an apparatus comprises: at least one processor, and at least one memory comprising computer readable program code. The at least one memory and the computer readable program code configured to, with the at least one processor perform a process comprising: collecting sleep data from a first sleep tracker about a first person and a second sleep tracker about a second person, and receiving a signal from a sensor. The method also includes determining which of the first person or the second person to alert based on the sleep data and a criteria, and alerting the first person or the second person based on the determination.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous components. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

This disclosure describes systems, apparatuses, processes (also referred to as methods), and computer-readable media for improving the way parents decide will take care of children at night by only alerting one of the parents and letting the other continue to sleep. The disclosure describes systems and methods that analyze and compare sleeping data to determine which of the persons sleeping is in the best condition to wake up. These methods and systems allow parents to optimize their sleep and still take care of children at night.

The disclosure describes embodiments that compare the sleep of multiple persons sleeping. Sleep data is gathered about each of the multiple persons. The sleep data is then analyzed and at any given moment the data of the multiple persons can be compared in order to determine which person should be alerted. That person is then alerted and the other sleeping person is allowed to remain sleeping.

Figure 1:
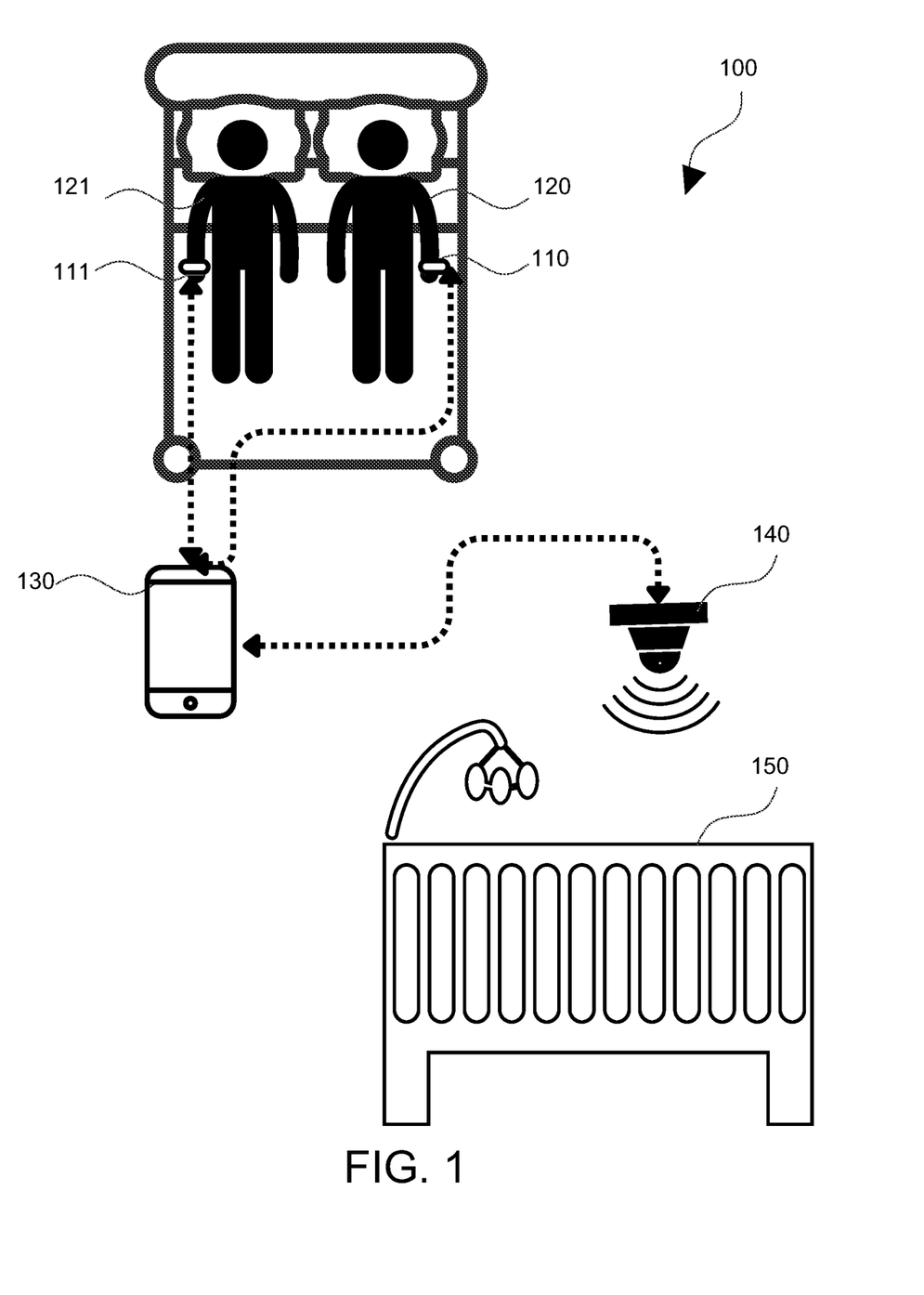
FIG. 1 is a schematic diagram of an example environment in accordance with various aspects of the subject technology.

In FIG. 1, a schematic environment 100 of an example embodiment is shown. A first person 120 and a second person 121 of what could be several persons are shown to be asleep. In FIG. 1 the first person 120 has a corresponding sleep tracker 110 and the second person 121 has sleep tracker 111. There are many types of sleep trackers. Some may be worn like a smart watch, smart ring, or bracelet. Others may be positioned adjacent to the person, on or in a bed, attached to the person. Sleep trackers may monitor different metrics including but not limited to heart rate, skin temperature, body movement, blood oxygen levels, brain activity, and body temperature.

FIG. 1 shows a processor 130. The processor 130 may be a mobile phone, virtual voice assistant device, cloud processor, a wearable device, or any other suitable processor. The processor 130 is coupled with sleep trackers 110 and 111, as well as a sensor 140. The sensor 140 in this embodiment is monitoring a subject 150 (e.g., a baby located in a crib) the subject could be a person, an environment, a thing, or anything that a sensor could monitor. The coupling of the processor 130 to the sleep trackers 110 and 111, and the sensor 140 may be over a network such as wifi or the internet, or over a wireless connection type such as Bluetooth®. There may be multiple sensors 140 that are monitoring the same or multiple different subjects 150. The sensors 140 may include any type of sensor (e.g., audio, visual, infrared light emitting devices, non-visible light, thermo, heart rate monitor, blood oxygen, accelerometer, etc. . . . ).

While the first person 120 and the second person 121 are sleeping, the sleep trackers 110 and 111 gather sleep data related to the corresponding person and transmit the data to the processor 130. The data may include or be related to what type of sleep the persons 120 and 121 are in such as Rapid Eye Movement ("REM"), deep sleep, light sleep, or intermediate sleep. The data may include or be related to how long the persons 120 and 121 have been asleep, it may include or be related to metrics like heart rate, blood oxygen, body movement, brain activity, blood pressure. The sleep data should not be limited to just those that have been listed but may include any information that may help the processor to make a determination about the sleeping condition of persons 120 and 121.

When a change that is detectable by sensor 140 occurs in, around, or with the subject 150, sensor 140 sends a signal to processor 130. Processor 130 then analyzes and compares the sleep data of persons 120 and 121, and makes a determination of which person to alert based on a criteria or combination of criteria.

In order to determine which of the sleeping persons to alert, a criteria for making the determination is selected. Users may choose the criteria or rely on a default criteria. Some example embodiments may us the following criteria, however this list should not be considered exhaustive: amount of time slept, quantity of a specific type of sleep (i.e., Rapid Eye Movement ("REM") sleep, deep sleep, intermediate sleep, or light sleep), current phase of a sleep cycle, current type of sleep, amount of a specific combination of the types of sleep, quantity of completed sleep cycles, when a wake up alarm is scheduled, who received the previous alert, who has received the most alerts, what time it is (e.g., alerting one person during one time period and the other in another time period), and percentage of needed sleep time obtained. Needed sleep can be set by each of the persons and may mean the minimum amount of sleep or sleep cycles that a person needs to receive in a night to be well rested. A sleep cycle is understood by those skilled in the art to be an oscillation between the slow-wave and REM (paradoxical) phases of sleep. It is sometimes called the ultradian sleep cycle, sleep-dream cycle, or REM-NREM cycle, to distinguish it from the circadian alternation between sleep and wakefulness. In humans, this cycle takes 70 to 110 minutes (90±20 minutes).

Combinations of criteria may be used in order to prioritize certain criteria above others. For example, the alert may be sent to the person with the most completed sleep cycles, unless that person has received a certain number of alerts more than the other person. Another example may include sending the alert to the person who has an alarm scheduled later, unless the other person is in light sleep and the person is not. These are merely illustrations of how combining criteria may be done and should in no way be understood to be limited by the examples provided.

Figure 2:
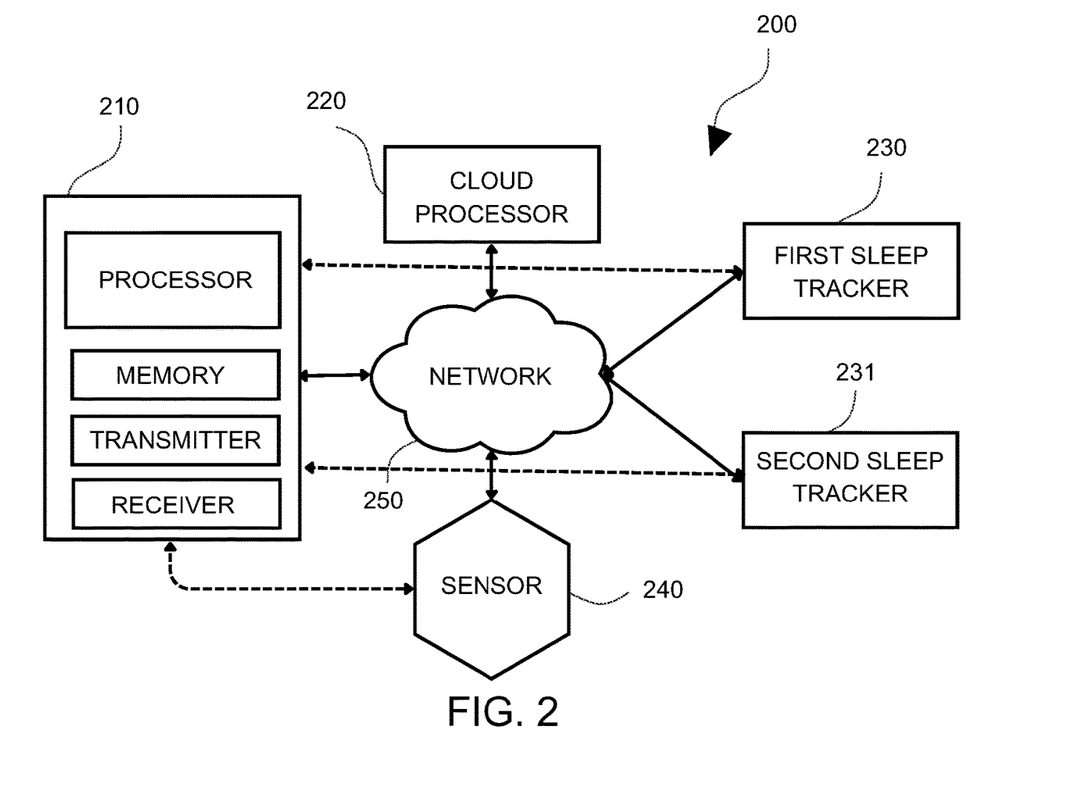
FIG. 2 is a block diagram illustrating a suitable computing environment for aspects of the subject technology.

FIG. 2 is a block diagram illustrating a suitable computing environment 200 for the system of an embodiment. Apparatus 210, may be a mobile phone, a virtual voice assistant, or any other suitable hardware. Apparatus 210 comprises a processor, memory, transmitter, and receiver. The memory may include computer readable program code. The memory and the computer readable program code are configured with the processor to perform processes and methods similar to those described in FIGS. 3 and 4. Apparatus 210, may be connected to various different networks 250, such as the internet, a private wifi network, or any other suitable network.

The sensor 240 may also be connected to the cloud processor 220 via the network 250. The sensor 240 may be connected directly to the apparatus 210 or through network 250. The sensor may transmit the signal indicating a change in the subject to the cloud processor 220 in some embodiments and to the apparatus 210 in other embodiments, or both in other embodiments. In some embodiments the processor may be in a sleeptracker 230 or 231.

The first sleep tracker 230 and the second sleep tracker 231 may be connected to the apparatus 210 through the networks 250 or directly, such as via Bluetooth® or any other suitable means. Similar to the sleep trackers 110 and 111 described in FIG. 1, sleep trackers 230 and 231, track the sleep of a first and second person and transmit sleep data to a processor. In certain embodiments, the processor may be a cloud processor 220 that is connected through network 250. The cloud processor 220 may analyze and compare the sleep data and transmit an alert signal directly to an alert device such as a sleep tracker 230 or 231, the apparatus 210, a separate mobile phone, an audio alarm, a haptic alarm, a visual alarm, or mechanical mechanism configured to perform an operation to alert a person. In other embodiments, the cloud processor may transmit the determination to the apparatus and the apparatus will transmit the alert signal to the alert device. The alert device then activates the alarm. The alarm, as discussed above, may be haptic, audio, or visual.

Figure 3:
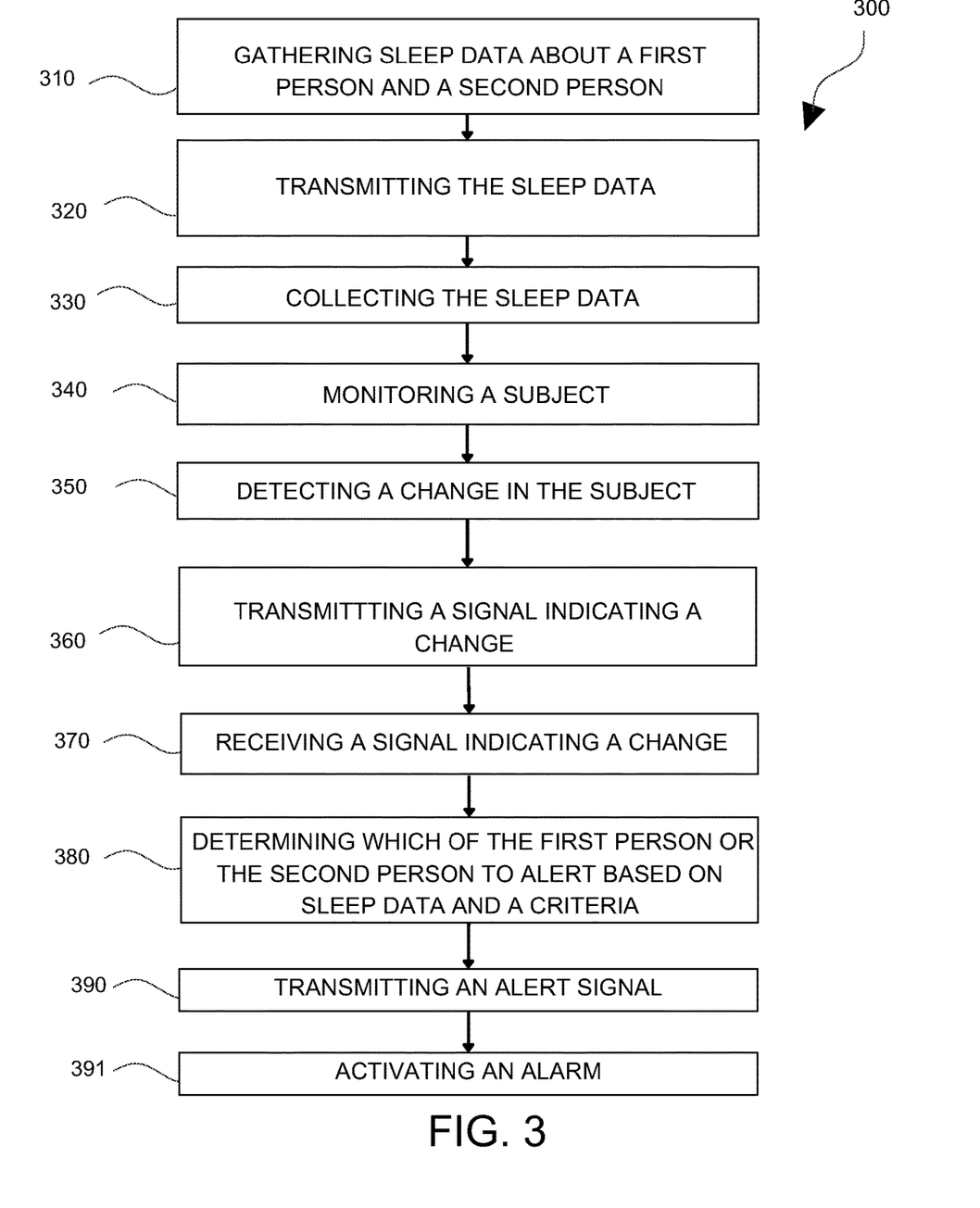
FIG. 3 is a flow diagram illustrating a method of alerting a sleeping person according to various aspects of the subject technology.

FIG. 3 is a flow diagram illustrating a method 300 for determining which of multiple people to alert when a sensor detects a change according to certain embodiments. The method 300 may be performed by the system described in the environment 100, 200, 500, or 600. It will be appreciated that the method 300 may be performed on any suitable hardware.

In operation 310, the sleep trackers gather sleep data about a first person and a second person. As described above, the sleep trackers gather sleep data by monitoring any number of metrics like body movement, brain activity, heart rate, or blood oxygen level.

In operation 320, the sleep trackers transmit the sleep data to a processor. The transfer could occur via a network or other wireless connection. In operation 330, the processor collects the data received from the sleep trackers. In operation 340, at least one sensor monitors a subject. The subject may be a person, an environment, or anything that a sensor could monitor.

In operation 350, at least one sensor detects a change in the subject. For example, the sensor may detect movement of the baby, screaming or crying, heart rate change, change in bodily temperature, or change in ambient temperature, movement in a certain area, or a specific noise. These types of changes are merely examples meant to be illustrative of the type of change that a sensor might detect but should not be understood to be an exhaustive list.

Additionally, a threshold amount of detected change or a certain combination of detected changes may be required before proceeding to the next operation. For example, the sensor may require continuous movement for an amount of time or in a specific place, screaming for an amount of time or at a certain volume level, reaching a specific body temperature, or reaching a specific ambient temperature. These examples are merely examples of a few types of threshold detections and not an exhaustive list of what could be used. Additionally, in certain embodiments combinations of multiple changes detected and/or thresholds may be used.

In operation 360 the at least one sensor transmits a signal indicating the detected change. In operation 370, the processor receives the signal. The signal may be received directly or indirectly though networks or other devices.

In operation 380, the processor determines which of the first person or the second person to alert based on the sleep data and a criteria. The discussion of criteria above also applies here. The sleep data of the first person and the sleep data of the second person are analyzed based on the criteria to determine which person will be alerted.

In operation 390, the processor transmits an alert signal to an alert device that either the first person or the second person should be alerted based on the determination from operation 380. Each of the first person and the second person have a corresponding alert device. The alert device may also be the corresponding sleep tracker. In operation 391, the alert device activates an alarm that alerts the first or second person. The alarm may be a haptic alarm, audio, alarm, or visual alarm. In certain embodiments with multiple sensors, the processor may transmit a different alert signal corresponding to each detected change or combination of detected change. The alarm may increase in intensity, frequency, magnitude, or volume if the corresponding sleep tracker does not detect that the alerted person has perceived the alarm.

Figure 4:
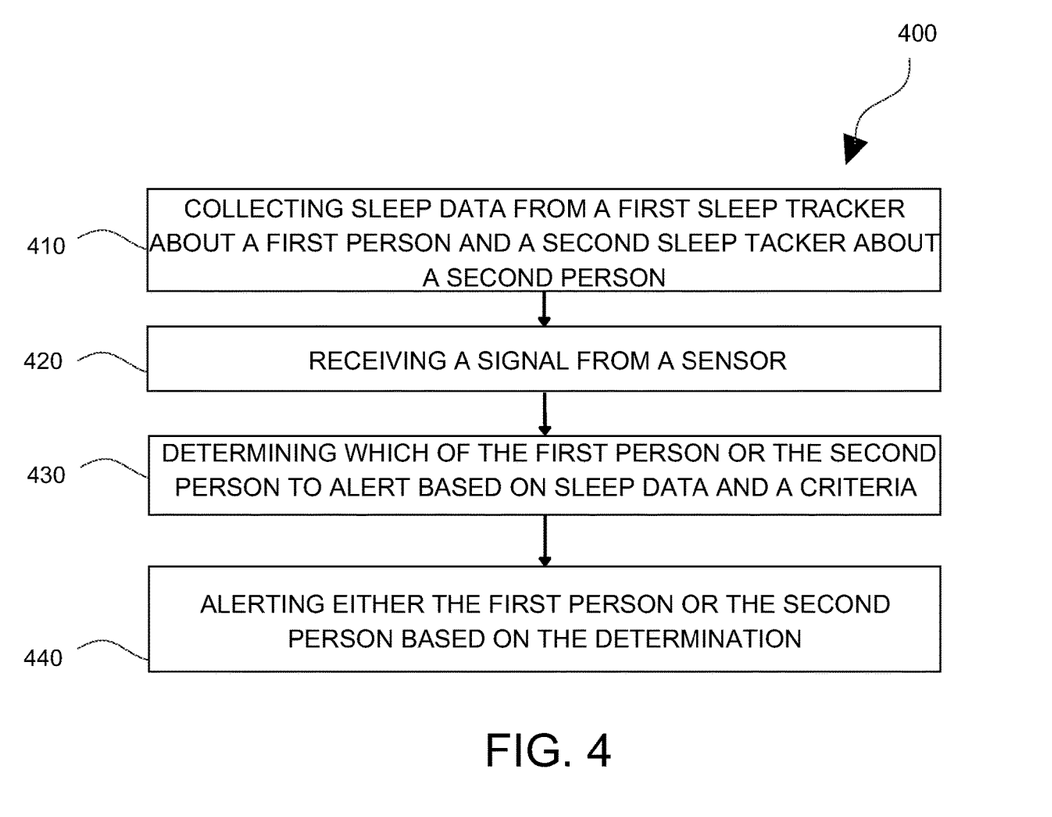
FIG. 4 is a flow diagram illustrating a method of alerting a sleeping person according to various aspects of the subject technology.

FIG. 4 is a flow diagram illustrating a method 400 for determining which of multiple people to alert when a sensor detects a change according to certain embodiments. The method 400 may be performed by an apparatus or device with a processor or a cloud processor as described in the environment 100, 200, 500, or 600. It will be appreciated that the method 400 may be performed on any suitable hardware.

In an embodiment, operation 410, a processor collects sleep data from a first sleep tracker about a first person and a second sleep tracker about a second person. The processor may receive the sleep data via networks or directly from sleep trackers via wireless connection. As discussed above, the sleep data may be any type of data that the processor uses to analyze the sleep of the first and second person. Some examples of sleep data may include heart rate, sleep status, amount of time slept, current type of sleep, blood oxygen levels, quantity of completed sleep cycles, body movement, brain activity, etc. . . .

In operation 420, the processor receives a signal from at least one sensor indicating a change in a subject monitored by the at least one sensor. As discussed above, the change could be any change detected by a sensor (e.g., motion, visual, audio, temperature, etc. . . . ). Apparatus may receive the signal through networks or directly from the sensor through wireless or wired connection.

In operation 430, the processor determines which of the first person or the second person to alert based on the sleep data and criteria. Multiple criteria and combinations of criteria may be used.

In operation 440, the processor alerts either the first person or the second person based on the determination in operation 430. The alerting may include sending an alert signal to the alert device. In certain embodiments the alert device may be a sleep tracker or designated alarm device. The alert device then activates an alarm alerting either the first person or the second person based on the determination of operation 430. As discussed above, the alarm may be haptic, audio, or visual cue (such as opening curtains or turning on a light).

Figure 5:
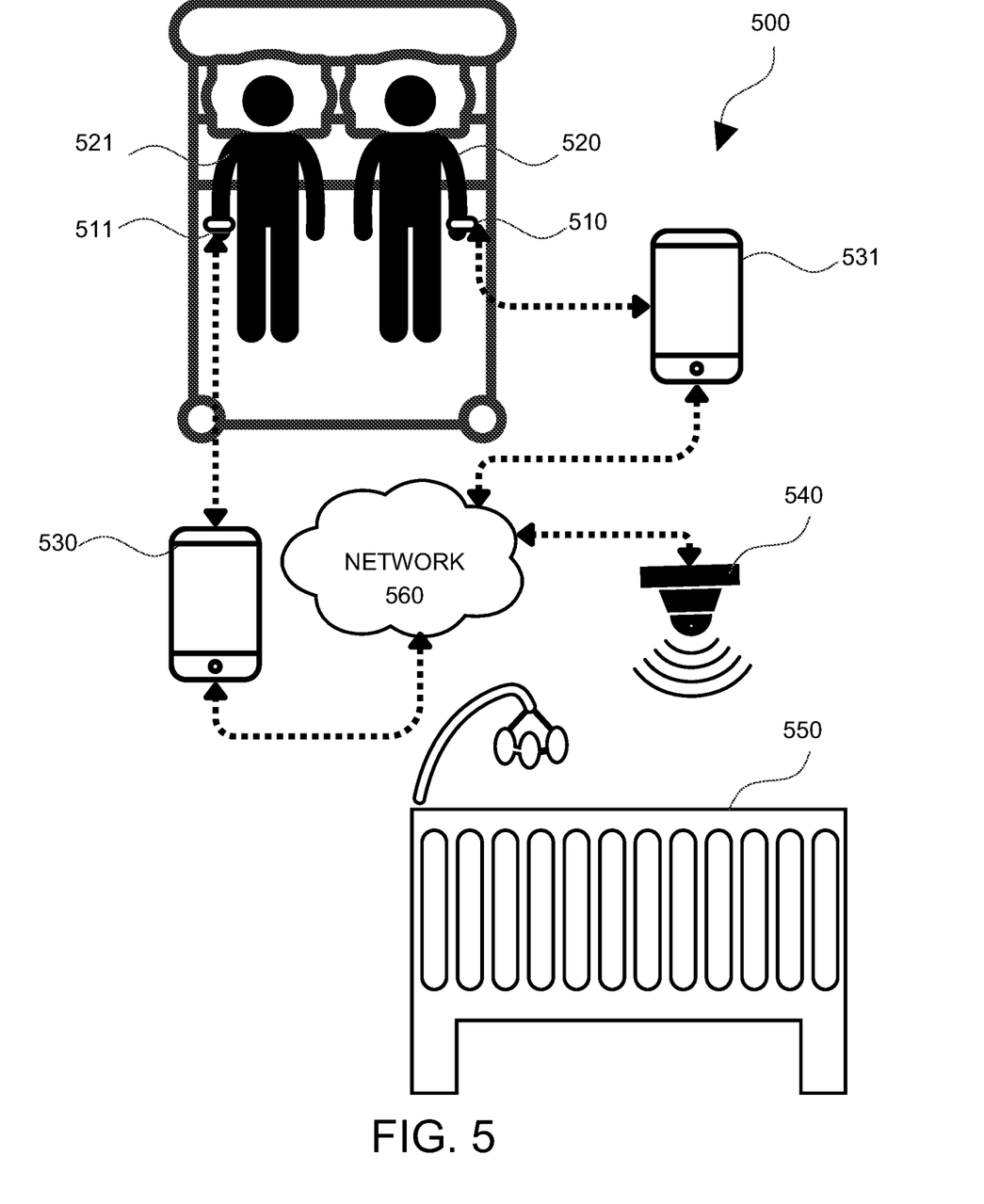
FIG. 5 is a schematic diagram of an example environment in accordance with various aspects of the subject technology.

In FIG. 5, a schematic environment 500 of an example embodiment is shown. A first person 520 and a second person 521 of what could be several persons are shown to be asleep. In FIG. 5 the first person 520 has a corresponding sleep tracker 510 and the second person 521 has sleep tracker 511. Each sleep tracker is connected to processor 530 and 531. Each processor 530 and 531 are connected to a network 560 which may be the internet, wifi network, or any other suitable network. or 130. The processors 530 and 531 may be a mobile phone, virtual voice assistant device, cloud processor, a wearable device, or any other suitable processor. The processors 530 and 531 are also connected to at least one sensor 540. The at least one sensor 540 in this embodiment is monitoring a subject 550 (e.g., a baby located in a crib) the subject could be a person, an environment, a thing, or anything that a sensor could monitor. The connection of the processors 530 and 531 and the at least one sensor 540 may be over a network such as wifi or the internet, wired connection, or over a wireless connection type such as Bluetooth®. There may be multiple sensors 540 that are monitoring the same or multiple different subjects 550. The sensor 540 may include any type of sensor (e.g., audio, visual, infrared light emitting devices, non-visible light, thermo, heart rate monitor, blood oxygen, accelerometer, etc. . . . ).

While the first person 520 and the second person 521 are sleeping, the sleep trackers 510 and 511 gather sleep data related to the corresponding person and transmit the data to the processors 530 and 531. When a change that is detectable by sensor 540 occurs in, around, or with the subject 550, sensor 540 sends a signal to processors 530 and 531. Either or both of processors 530 and 531 then analyze the sleep data of persons 520 and 521, and make a determination of which person to alert based on a criteria or combination of criteria.

Figure 6:
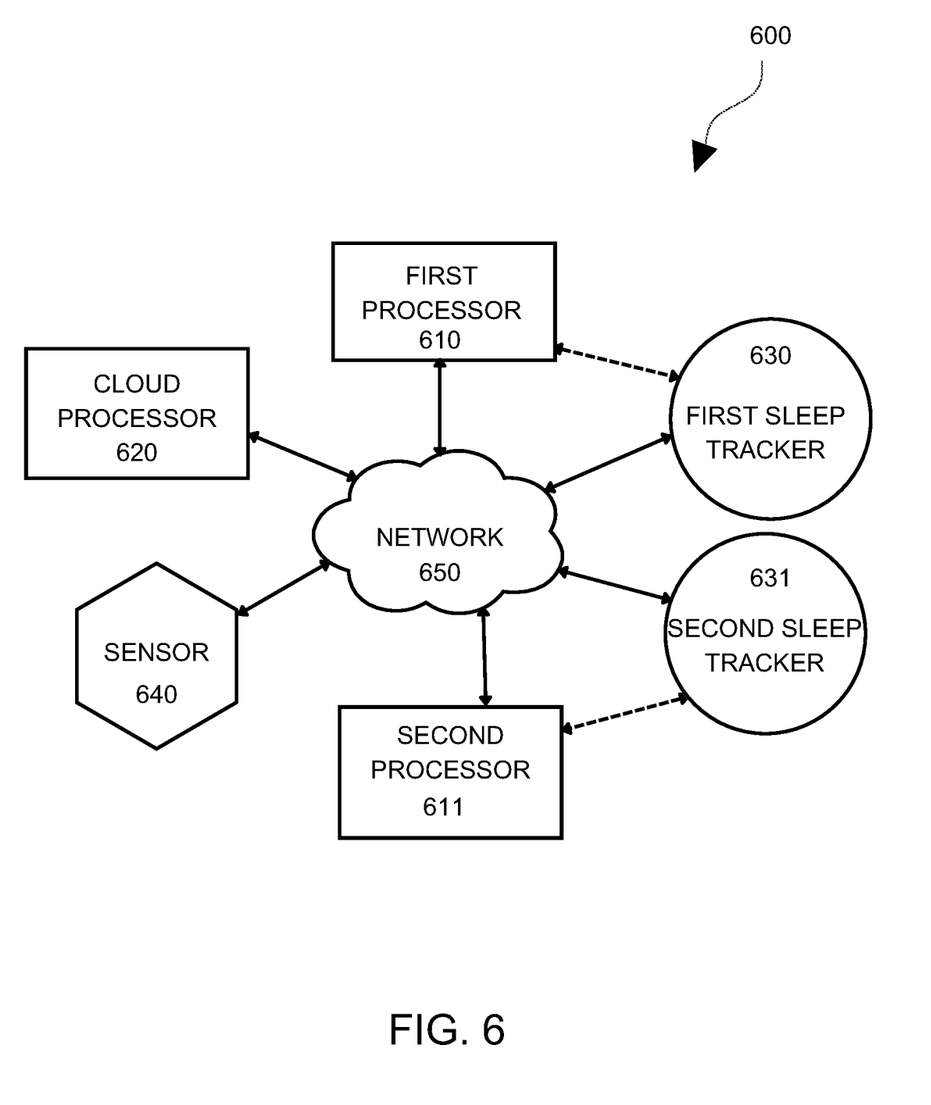
FIG. 6 is a block diagram illustrating a suitable computing environment for aspects of the subject technology.

FIG. 6 is a block diagram illustrating a suitable computing environment 600 for the system of an embodiment. First processor 610 and second processor 611, may be mobile phones, virtual voice assistants, or any other suitable hardware. First and second processors 610 and 611 may be apparatuses similar to apparatus 210 comprising a processor, memory, transmitter, and receiver. The memory may include computer readable program code. The memory and the computer readable program code are configured with the processor to perform processes and methods similar to those described in FIGS. 3 and 4. First and second processors 610 and 611, may be connected to various different networks 650, such as the internet, a wifi network, or any other suitable network. The first and second processors 610 and 611 may also be connected to a cloud processor 620 via the network 650.

The sensor 640 may also be connected to the cloud processor 620 via the network 650. The sensor 640 may be connected directly to the first and second processors 610 and 611 or through network 650. The sensor may transmit the signal indicating a change in the subject to the cloud processor 620 in some embodiments and to first and/or second processors 610 and 611 in other embodiments, or all in other embodiments. In some embodiments the processor may be in a sleeptracker 630 or 631.

The first sleep tracker 630 and the second sleep tracker 631 may be connected to the first and second processors 610 and 611 through the networks 650 or directly through a wireless connection, such as via Bluetooth® or any other suitable means. Similar to the sleep trackers 510 and 511 described in FIG. 5, sleep trackers 630 and 631, track the sleep of a first and second person and transmit sleep data to the respective first and second processors 610 and 611. The cloud processor 620 may analyze and compare the sleep data and transmit an alert signal directly to an alert device such as a sleep tracker 630 or 631, first or second processors 610 and 611, a separate mobile phone, an audio alarm, a haptic alarm, a visual alarm, or mechanical mechanism configured to perform an operation to alert a person. In other embodiments, the cloud processor may transmit the determination to the apparatus and the apparatus may transmit the alert signal to the alert device. The alert device then activates the alarm. The alarm, as discussed above, may be haptic, audio, or visual. In other embodiments there may not be a cloud processor 620 and the first processors 610 and/or the second processor 611 make the determination and transmit the alert signal.

Embodiments or aspects of embodiments may be combined where possible.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, program code, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Illustrative aspects of the disclosure include:

Aspect 1: A method comprising: collecting sleep data from a first sleep tracker about a first person and a second sleep tracker about a second person; receiving a signal from a sensor; determining which of the first person or the second person to alert based on the sleep data and a criteria; and alerting the first person or the second person based on the determination.

Aspect 2: The method of Aspect 1, wherein the criteria comprises which of the first person or the second person has had more sleep.

Aspect 3: The method of Aspect 1, wherein the criteria comprises which of the first person or the second person has had more of either Rapid Eye Movement (REM) sleep, deep sleep, intermediate sleep, or light sleep.

Aspect 4: The method of Aspect 1, wherein the criteria comprises which phase of the sleep cycle the first person and the second person are in at the time of the detection.

Aspect 5: The method of Aspect 1, wherein the sensor comprises at least one of an optical sensor, an audio sensor, a thermo sensor, and a biometric sensor.

Aspect 6: The method of Aspect 1, wherein the alerting comprises activating an alarm and the alarm comprises at least one of a haptic alert, an audio alert, or a visual alert.

Aspect 7: The method of Aspect 1, wherein the criteria comprises which of the first person or the second person has more time until a first alarm or a second alarm corresponding to the first and the second persons.

Aspect 8: The method of Aspect 1, wherein the criteria comprises which of the first person or the second person was previously alerted.

Aspect 9: The method of Aspect 1, wherein the criteria comprises which of the first person or the second person has obtained a higher percentage of required sleep time.

Aspect 10: The method of Aspect 1 further comprising at least two sensors, wherein the alerting comprises a different alert corresponding to a different signal or combination of signals from the at least two sensors.

Aspect 11: The method of Aspect 1, wherein a magnitude of the alert increases with a duration of the detection.

Aspect 12: The method of Aspect 1, wherein the criteria comprises which of the first person or the second person has completed the most sleep cycles.

Aspect 13: The method of Aspect 1, wherein the criteria comprises alerting the first person during a period of time and alerting the second person during another time.

Aspect 14: A system comprising: a processor coupled to a first sleep tracker, a second sleep tracker, and a sensor; the first sleep tracker gathers a first sleep data about a first person and transmits the first sleep data to the processor; the second sleep tracker gathers a second sleep data about a second person and transmits the second sleep data to the processor; the sensor monitors a subject and sends a signal to the processor when a change is detected; the processor determines whether to alert the first person or the second person based on the first sleep data, the second sleep data, and a criteria; and the processor alerts the first person or the second person based on the determination.

Aspect 15: The system of claim 14 further comprises a first alert device and a second alert device corresponding to the first person and the second person, wherein the alert comprises an transmitting an alert signal to either the first alert device or the second alert device and the alert device receiving the alert signal activating an alarm.

Aspect 16: The system of claim 15, wherein the first alert device is the first sleep tracker and the second alert device is the second sleep tracker.

Aspect 17: The system of claim 15, wherein the alarm comprises at least one of a haptic alert, an audio alert, or a visual alert.

Aspect 18: The system of claim 14, further comprises a second processor and a third processor, wherein the second processor receives the first sleep data from the first sleep tracker and the third processor receives the second sleep data from the second sleep tracker, and the second processor and the third processor transmit the first sleep data and the second sleep data to the processor.

Aspect 19: The system of claim 14, wherein the sensor comprises at least one of an optical sensor, audio sensor, thermo sensor, heart rate monitor, and biometric sensor.

Aspect 20: An apparatus comprising: at least one processor; and at least one memory comprising computer readable program code; the at least one memory and the computer readable program code configured to, with the at least one processor perform a process comprising: collecting sleep data from a first sleep tracker about a first person and a second sleep tracker about a second person; receiving a signal from a sensor; determining which of the first person or the second person to alert based on the sleep data and a criteria; and alerting the first person or the second person based on the determination.

What is claimed:

1. A method comprising:
   collecting sleep data from a first sleep tracker about a first person and a second sleep tracker about a second person;
   receiving a signal from a sensor;
   determining which of the first person or the second person to alert based on the sleep data and a plurality of criteria;
   wherein the sleep data comprises heart rate and body movement;
   wherein the plurality of criteria comprises comparing a current sleep phase of each person; comparing an amount of time slept by each person; comparing prior alerts sent to each person; and assessing which of the first person or the second person has obtained a minimum amount of sleep based on assessing a percentage of needed sleep, wherein the needed sleep is set by at least one of the first person and the second person; and
   alerting the first person or the second person based on the determination.

2. The method of claim 1, wherein the plurality of criteria further comprises which of the first person or the second person has had more Rapid Eye Movement (REM) sleep and deep sleep.

3. The method of claim 2, wherein the plurality of criteria further comprises which of the first person or the second person has more time until a first wakeup alarm or a second wakeup alarm corresponding to the first and the second persons.

4. The method of claim 1, further comprising:
   monitoring by the sensor; and
   sending, by the sensor, the signal after detecting a threshold amount of change.

5. The method of claim 4, wherein monitoring by the sensor further comprises monitoring by at least two sensors;
   wherein the threshold amount of change comprises a combination of detected change from the at least two sensors.

6. The method of claim 5, wherein the combination of detected change comprises a continuous movement for a first amount of time and a sound produced at a minimum volume.

7. The method of claim 6, wherein the combination of detected change further comprises at least the minimum volume be detected for a second amount of time.

8. The method of claim 7, wherein the combination of detected change further comprises a detection of temperature change.

9. The method of claim 8, wherein the plurality of criteria further comprises assessing a time of day.

10. A system comprising:
    a processor coupled to a first sleep tracker, a second sleep tracker, and a sensor;
    the first sleep tracker gathers a first sleep data about a first person and transmits the first sleep data to the processor;
    the second sleep tracker gathers a second sleep data about a second person and transmits the second sleep data to the processor;
    the sensor monitors a subject and sends a signal to the processor when a change is detected;
    the processor determines whether to alert the first person or the second person based on the first sleep data, the second sleep data, and a plurality of criteria,
    wherein the first and second sleep data comprise heart rate and body movement;
    wherein the plurality of criteria comprises comparing a current sleep phase of each person; comparing an amount of time slept by each person; comparing prior alerts sent to each person; and assessing which of the first person or the second person has obtained a minimum amount of sleep based on assessing a percentage of needed sleep, wherein the needed sleep is set by at least one of the first person and the second person; and
    the processor alerts the first person or the second person based on the determination.

11. The system of claim 10 further comprising:
    at least one additional sensor, a first alert device and a second alert device corresponding to the first person and the second person,
    wherein the alert comprises transmitting an alert signal to either the first alert device or the second alert device and the alert device receiving the alert signal activating an alarm; and
    wherein the change detected comprises a combination of continuous movement for a first amount of time and a sound produced at at least a minimum volume for a second amount of time.

12. The system of claim 11, wherein the combination of change further comprises a detection of temperature change.

13. The system of claim 11, wherein the plurality of criteria further comprises a minimum amount of sleep based on a percentage of needed sleep.

14. The system of claim 10, wherein the sensor and the at least one additional sensor are monitoring different attributes of a person.

15. The system of claim 14, wherein the sensor and the at least one additional sensor, respectively, comprise at least one of an optical sensor, audio sensor, temperature sensor, heart rate monitor, and biometric sensor.

16. An apparatus comprising:
    at least one processor; and
    at least one memory comprising computer readable program code;
    the at least one memory and the computer readable program code configured to, with the at least one processor perform a process comprising:
    collecting sleep data from a first sleep tracker about a first person and a second sleep tracker about a second person;
    receiving a signal from a sensor;

determining which of the first person or the second person to alert based on the sleep data and a plurality of criteria;

wherein the plurality of criteria comprises evaluating near real-time sleep stage, physiological data of the first person and the second person, information about prior alerts, user-selected preferences, and a percentage of needed sleep;

wherein the needed sleep is set by the user-selected preferences comprising a minimum amount of time slept;

wherein the physiological data comprises heart rate and body movement; and alerting the first person or the second person based on the determination.

* * * * *